(12) United States Patent
Dean et al.

(10) Patent No.: US 6,341,762 B1
(45) Date of Patent: Jan. 29, 2002

(54) SERVICE VALVE AND USE OF SAME IN REACTION CONTROL SYSTEM

(75) Inventors: Michael Bruce Dean, Littleton; Frank Charles Zegler, Idledale, both of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/569,565

(22) Filed: May 12, 2000

Related U.S. Application Data

(60) Provisional application No. 60/134,707, filed on May 18, 1999, and provisional application No. 60/134,765, filed on May 18, 1999.

(51) Int. Cl.⁷ .............................. F16K 31/44
(52) U.S. Cl. .................. 251/347; 137/800; 251/340; 251/346; 251/900; 222/386.5; 60/259; 244/169; 244/172
(58) Field of Search ................ 137/240, 800; 251/340, 346, 347, 349, 350, 353, 273, 900; 222/386.5; 60/259; 244/169, 172

(56) References Cited

U.S. PATENT DOCUMENTS

| | | | |
|---|---|---|---|
| 490,904 A | * 4/1893 | Gray | 137/800 |
| 656,195 A | * 8/1900 | Johnson | 251/347 |
| 1,706,072 A | * 3/1929 | Rieger | 251/347 |
| 3,123,337 A | 3/1964 | Peras | 251/333 |
| 3,367,626 A | 2/1968 | Stern | 251/340 |
| 3,856,262 A | 12/1974 | Jordan | 251/340 |
| 3,985,332 A | 10/1976 | Walker | 251/111 |
| 4,413,806 A | 11/1983 | Anderson | 251/340 |
| 4,495,965 A | 1/1985 | Ise | 137/599 |
| 4,634,093 A | 1/1987 | Schintgen | 251/82 |
| 4,728,075 A | 3/1988 | Paradis | 251/122 |
| 4,848,403 A | 7/1989 | Pilolla et al. | 137/625.31 |
| 5,263,666 A | * 11/1993 | Hubert et al. | 244/172 |
| 5,816,539 A | * 10/1998 | Chan et al. | 244/172 |

* cited by examiner

Primary Examiner—Michael Powell Buiz
Assistant Examiner—Ramesh Krishnamurthy

(57) ABSTRACT

Various types of valves are disclosed, as well as the use of the same in a reaction control system for space travel vehicle applications. Multiple functions are provided by one of these valve designs by providing multiple flowpaths through the valve. An inflow and outflow tube of this multifunctional valve are fluidly interconnected with first and second chambers, respectively, within the valve. These first and second chambers are isolated from each other by a barrier assembly which may be "removed" at the desired type by a barrier rupture assembly to provide one of the noted multiple flowpaths (i.e., the inflow tube, the first chamber, the second chamber, and the outflow tube). A separate service port is fluidly interconnected with each of the first and second chambers, and a separate service valve may be disposed in each of these service ports to provide additional flowpaths for the multifunctional valve. One flowpath which exists prior to a rupturing of the barrier assembly includes the inflow tube, first chamber, and its associated service valve. Another flowpath which exists prior to a rupturing of the barrier assembly includes the outflow tube, second chamber, and its associated service valve. Another valve disclosed herein is a service valve for providing for a flow/no flow condition within a fluid system. This service valve includes a valve body and a valve stem which is slidably disposed within a bore within the valve body. The valve stem may be moved between at least two positions to terminate flow through within the valve body and to allow flow through the valve body, respectively. The service valve is configured so as to be resistant to side loads and provides redundant seals on redundant sealing surfaces. In this regard, the service valve includes at least three longitudinally-spaced radial seals between the valve body and valve stem, which are appropriately sized and oriented relative to each other to provide the desired functions.

33 Claims, 8 Drawing Sheets

SERVICE VALVE AND USE OF SAME IN REACTION CONTROL SYSTEM

CROSS-REFERENCE TO RELATED APPLICATIONS

This patent application claims priority from U.S. Provisional Patent Application No. 60/134,707, filed May 18, 1999, and entitled "Reaction Control System Service Valve," the entire disclosure of which is incorporated by reference in its entirety herein, as well as U.S. Provisional Patent Application No. 60/134,765, filed May 18, 1999, and entitled "Multifunctional Reaction Control System Valve," the entire disclosure of which is incorporated by reference in its entirety herein.

STATEMENTS REGARDING FEDERALLY SPONSORED RESEARCH OR DEVELOPMENT

Not applicable.

FIELD OF THE INVENTION

The present invention generally relates to systems through which a fluid flow may be directed and, more particularly, to a service valve which may be utilized in such system to provide both "flow through" and "no flow" conditions in relation to the service valve.

BACKGROUND OF THE INVENTION

Fluids are transferred in various types of systems and to provide various types of functions. Reaction control systems are used by launch vehicles and in other spacecraft/spacecraft applications as well. Various types of fluids are transferred within these types of systems to provide various types of functions. Components of one known prior art reaction control system include a ullage bottle which is disposed within a rigid rocket fuel storage bottle. The ullage bottle is fluidly interconnectable with a pneumatics system by a first fluid conduit which includes a first pyrotechnic isolation valve. A first service valve interfaces with this first fluid conduit at a location which is between the first pyrotechnic isolation valve and the ullage bottle to allow an appropriate fluid (e.g., helium) to be directed into and removed from the ullage bottle prior to activating the first pyrotechnic isolation valve and for purposes which are addressed below.

A second fluid conduit interconnects the rocket fuel storage bottle with a rocket fuel tank. One or more rocket engine modules in turn are fluidly interconnected with this rocket fuel tank. Therefore, the storage bottle is a "holding tank" of sorts for the rocket fuel. A second pyrotechnic isolation valve is disposed within the second fluid conduit to isolate the storage bottle from the rocket fuel tank until the desired time. A second service valve interfaces with the second fluid conduit at a location which is between the second pyrotechnic isolation valve and the rocket fuel storage bottle to allow an appropriate rocket fuel (e.g., hydrazine) to be loaded within and unloaded from the storage bottle prior to activation of the second pyrotechnic isolation valve and using the above-noted first service valve. More specifically, fluid may be directed into the ullage bottle through the first service valve to unload rocket fuel from the storage bottle and without providing the same to the rocket fuel tank. Fluid which is directed into the ullage bottle expands the same, which in turn forces rocket fuel out of the rocket fuel storage bottle and through the second service valve. A vacuum may be drawn through the first service valve as well to facilitate the loading of fuel within the rocket fuel storage bottle by directing the rocket fuel through the second service valve and into the storage bottle prior to an activation of the second pyrotechnic isolation valve, and thereby without directing any of such rocket fuel into the rocket fuel tank. third service valve of the noted prior art reaction control system interfaces with the second fluid conduit at a location which is between the second pyrotechnic isolation valve and the rocket fuel tank to allow a gas to be introduced into and removed from the rocket fuel tank and/or rocket engine modules interconnected therewith prior to activation of the second pyrotechnic isolation valve. For instance, it may be desirable to introduce an appropriate gas (e.g., nitrogen) into the rocket fuel tank and within the rocket engine modules to retain the same in a "clean" condition until a certain amount of time before the rocket engine modules are to be activated. At the appropriate time, this gas may be removed from the rocket fuel tank and rocket engine modules through the third service valve by drawing a vacuum through the same. Thereafter and at the appropriate time, the first and second fluid isolation valves may be simultaneously activated to remove the isolation between the ullage bottle and the pneumatics system and between the rocket fuel storage bottle and the rocket fuel tank. Fluid which is directed into the ullage bottle by the pneumatics system expands the same. Reduction of the inner volume of the storage bottle forces rocket fuel out of the same and through the second pyrotechnic isolation valve to the rocket fuel tank for use by the rocket engine modules.

The above-noted prior art system has the noted isolation and service valves each being separately interconnected with the reaction control system by welds or the like. Moreover, each of these service valves and pyrotechnic isolation valves are mounted on separate panels in this prior art system. The disadvantages of this particular system configuration and assembly technique include that it is much more costly and labor intensive to install.

The service valves utilized by the above-noted prior art reaction control system open and close the flow of fluids, such as liquids and gases, from one tank to another tank. Valves generally of this type are currently available from Moog and OEA, Inc., and utilize a metal-to-metal seal (e.g., metal ball against a metal channel) to close or seal the valve. In such cases, to avoid leakage, the metal ball and metal channel must be made with a high degree of precision to ensure an adequate seal is achieved. In addition, such metal-to-metal seals in such existing service valves require a specific torque to seal the valve (e.g., 45 inch pounds, plus or minus 2 inch pounds). Otherwise, the seal formed by the metal ball and metal channel may leak, which is particularly dangerous in instances where the fluid is a hypergolic fluid, such as hydrozene. For example, in instances where the metal-to-metal seal is under-torqued, leakage may occur. In other instances, where the metal-to-metal is over-torqued, the metal ball may be galled, which may also cause leakage. And since such valves are typically hand-tightened, the amount of torquing of the valves is generally inconsistent, and is often under-torqued or over-torqued. When such metal-to-metal seals leak, in order to replace such valves, the valves must be typically be cut-out since such valves are again typically welded in place. In addition, the normal flow area in such currently available valves is small, and, as such, filling a tank with a fluid through such currently existing valves requires a great deal of time. In instances where the fluid is a hypergolic fluid, due to the poisonous and explosive nature of the fluid, the area must be evacuated for an extended period of time during the flow of fluid through the valve. Finally, such existing valves require a series of brackets to support the valve since such valves are subject to side loading. Such side loading can adversely affect the seal by gallings side surfaces of the valve, which may also cause leakage.

BRIEF SUMMARY OF THE INVENTION

Certain aspects of the present invention relate to a multifunctional valve. Other aspects of the present invention relate to a fluid transfer system, such as reaction control system for a launch vehicle or other spacecraft application, which includes at least one of the noted multifunctional valves and at least one service valve to control the flow of fluid throughout this system in a desired manner. Still other aspects of the present invention relate to a particular service valve design, and which is preferably utilized by the above-noted fluid transfer system.

By way of initial summary, one general aspect of the present invention relates to a multifunctional valve which is designed to be used in launch vehicle or spacecraft reaction control systems. Generally, this multifunctional valve is an integrated component, and is particularly useful in reaction control systems for launch vehicles and/or spacecraft since this particular multifunctional valve combines all of the required elements of previous reaction control systems. Specifically, a first such multifunctional valve may be utilized upstream of a fuel storage container to provide for fuel container pressurization, and a second such multifunctional valve may be utilized downstream of the fuel storage container to provide for fuel container loading and unloading and to provide for reaction control system loop blanket pressure maintenance. By virtue of utilizing first and second such multifunctional valves in a reaction control system for launch vehicle or spacecraft applications, interconnecting welds between system components is eliminated, and prior practices of assembling all components on panels and connecting such components with tubes is no longer required. As such, the particular multifunctional valves provide for a more compact reaction control system than panel assembled components, weighs less than the assembly of panel components, and is less expensive than such existing panel assemblies. Furthermore, utilization of these particular multifunctional valves in such reaction control systems provides for a more flexible and versatile assembly.

Continuing with the initial summary, another general aspect of the present invention again relates to a service valve. Preferably this particular service valve has an increased fluid or gas flow rate and an improved sealing capability which is not dependent upon a specific applied torque to seal the valve. One object of this service valve design is thereby that the same does not require torque to seal the same. It is another object of this service valve design is thereby to have an increased flow-throughput. It is yet another object of this service valve design to thereby be capable of withstanding shear loads without utilization of a series of brackets. It is a further object this service valve design to thereby have redundant sealing capabilities.

The above-noted general aspects of the present invention will now be addressed in greater detail.

A first aspect of the present invention is generally directed to a fluid transfer system or a system through which fluids may be transferred. The first aspect includes first and second fluid system components (e.g., fuel storage vessels or tanks) and a first fluid conduit which fluidly interconnects these first and second fluid system components. A valve assembly is disposed somewhere within the first fluid conduit and includes a valve body. An inlet and outlet extend within this valve body for directing fluid within, out of, and/or through the valve body, such that the inlet and outlet establish fluid communication between the valve body and the corresponding portion of the first fluid conduit. A first chamber is disposed within the valve body and is fluidly interconnected with the inlet, while a second chamber is disposed within the valve body and is fluidly interconnected with the outlet. Isolation of the first chamber from the second chamber within the valve body, and thereby also the inlet and outlet, until a certain time is provided by a barrier assembly. Prior to a removal of this isolation by a barrier rupture assembly, it may be desirable to utilize the valve assembly to direct a flow through a flowpath which includes the first chamber, inlet, and a portion of the first fluid conduit fluidly interconnected therewith, through a flow path which includes the second chamber, outlet, and a portion of the first fluid conduit fluidly interconnected therewith, or both. In this regard, the valve assembly of the subject first aspect also includes a first service port which extends within the valve body, which is fluidly interconnected with the first chamber both prior to and after any rupturing up the barrier assembly, and which receives a first service valve therein. Similarly, the valve assembly also includes a second service port which extends within the valve body, which is fluidly interconnected with the second chamber both prior to and after any rupturing up the barrier assembly, and which receives a second service valve therein.

The valve assembly of the subject first aspect of the present invention is multifunctional by providing multiple flowpaths. Initially and prior to a rupturing of the barrier assembly, the valve assembly serves to isolate that part of the first fluid conduit which interfaces with the inlet of the valve body from that part of the first fluid conduit which interfaces with the outlet of the valve body, and thereby serves to isolate the first fluid system component from the second fluid system component. Another function provided by the valve assembly associated with the first aspect and prior to a rupturing of the barrier assembly is that a flow may be directed through the first service valve, within the first chamber, through the inlet, and through that portion of the first fluid conduit which interfaces with this inlet, and vice versa. Similarly, prior to a rupturing of the barrier assembly a flow may be directed through the second service valve, within the second chamber, through the outlet, and through that portion of the first fluid conduit which interfaces with this outlet, and vice versa. Yet another function which made provided by the valve assembly associated with the first aspect of the present invention that it may serve to allow a flow between the first and second fluid system components after the barrier assembly is appropriately ruptured by the barrier rupture assembly. Such a flow would thereby be through the valve assembly after the isolation between its first and second chambers, and thereby between its inlet and outlet, is removed.

Various refinements exist of the features noted in relation to the first aspect of the present invention. Further features may also be incorporated in the first aspect of the present invention as well. These refinements and additional features may exist individually or in any combination. At least one pressure transducer may be interconnected with the valve body and fluidly interface with the first or second chambers prior to a rupturing of the barrier assembly. One pressure transducer could be provided so as to directly fluidly interface with either the first chamber or the second chamber. Prior to a rupturing of the barrier assembly, this particular pressure transducer would then monitor the pressure only within the first or the second chamber. After a rupturing of the barrier assembly, this particular pressure transducer would then monitor the pressure of the fluid traveling through the valve assembly. One pressure transducer could be provided for the first chamber and another pressure transducer could be provided for the second chamber as well such that the pressure in both of these chambers could be monitored both before a rupturing of the barrier assembly and after a rupturing of the barrier assembly.

The barrier assembly of the first aspect of the present invention may include at least one partition. This partition(s) may be integrally formed with the valve body. A pair of partitions may be utilized as well and may be spaced within the valve body. In this regard, the barrier rupture assembly would also then preferably include an initiator and a corresponding projectile for the first of these partitions, and a separate initiator and corresponding projectile for the second of these partitions. Rupturing either the first and/or second partition will fluidly interconnect the first and second chambers within the valve body, such that the use of multiple partitions and multiple barrier rupture subassemblies may be characterized as being for purposes of providing redundancy.

One particular application for the fluid transfer system of the subject first aspect is for space travel vehicles and the like. In one embodiment, the first and second fluid system components are each storage vessels or tanks of some type for housing in at least some respect an appropriate rocket fuel (e.g., hydrazine). One of these rocket fuel storage tanks may function as an initial holding tank of sorts, while the other of the rocket fuel storage tanks may be that which is directly fluidly interconnected with at least one, and possibly a plurality of, rocket engine modules. Consider the case where the first and second fluid system components are first and second rocket fuel tanks for a space travel vehicle or the like. The valve assembly associated with the first aspect of the present invention allows a rocket fuel to be directed from a rocket fuel supply system into the first rocket fuel tank without directing such rocket fuel into the second rocket fuel tank. In this regard, rocket fuel from the rocket fuel supply system may be directed through the first service valve, into the first chamber of the valve body, out through the inlet and to the first fluid conduit fluidly interconnected therewith, and into the first rocket fuel tank. None of this rocket fuel will be directed to the second rocket fuel tank at the time of the "loading" of the first rocket fuel tank due to the isolation which is still being provided between the first and second chambers of the valve assembly by the barrier assembly. Rocket fuel may be unloaded from the first rocket fuel tank by reversing the above-noted flowpath and without directing any of such rocket fuel to the second rocket fuel tank by retaining the integrity of the barrier assembly between the first and second chambers of the valve body.

Continuing with the above-noted example and where the second rocket fuel tank is fluidly interconnected with a plurality of rocket engine modules, the valve assembly associated with the first aspect of the present invention also allows an appropriate fluid to be directed into the second rocket fuel tank (e.g., a gas to keep the second rocket fuel tank and/or the rocket engine module(s) fluidly interconnected therewith "clean"). In this regard, an appropriate fluid (e.g., gaseous nitrogen) from a fluid supply system may be directed through the second service valve, into the second chamber of the valve body, out through the outlet and to the first fluid conduit fluidly interconnected therewith, and into the second rocket fuel tank and possibly the rocket engine module(s) fluidly interconnected therewith. None of this fluid is directed to the first rocket fuel tank at the time of the "loading" of the second rocket fuel tank due to the continued isolation provided between the first and second chambers of the valve assembly by the barrier assembly. This fluid may be "unloaded" from the second rocket fuel tank by reversing the above-noted flowpath and without directing any of such fluid into the first rocket fuel tank by retaining the integrity of the barrier assembly between the first and second chambers of the valve body.

A second aspect of the present invention is generally directed to a fluid transfer system or a system through which fluids may be transferred, and such may be used in combination with the above-noted first aspect of the present invention. The second aspect includes first and second fluid vessels. At least part of the first fluid vessel engages at least part of the second fluid vessel, such as in the case of a ullage bottle which is disposed within a rocket fuel tank to direct rocket fuel (e.g., hydrazine) out of the rocket fuel tank at the appropriate time and through an expansion of the ullage bottle. A first fluid conduit is fluidly interconnected with the first fluid vessel (e.g., fluid may be directed into and/or out of the first fluid vessel through the first fluid conduit), while a second fluid conduit is fluidly interconnected with the second fluid vessel (e.g., fluid may be directed into and/or out of the second fluid vessel through the second fluid conduit).

A first valve assembly is associated with the first fluid conduit and a second valve assembly is associated with the second fluid conduit. The first valve assembly includes a first valve body. A first inlet and first outlet extend within the first valve body for directing fluid within, out of, and/or through the first valve body. A first chamber is disposed within the first valve body and is fluidly interconnected with the first inlet, while a second chamber is disposed within the first valve body and is fluidly interconnected with the first outlet. Isolation of the first chamber of the first valve body from the second chamber of the first valve body, and thereby also the first inlet and first outlet, is provided by a first barrier assembly. Prior to a removal of this isolation by a first barrier rupture assembly associated with the subject second aspect, it may be desirable to utilize the first valve assembly to direct a flow through a flowpath which includes the first chamber of the first valve assembly, first inlet, and a fluid conduit which may be fluidly interconnected therewith, through a flowpath which includes the second chamber of the first valve assembly, first outlet, and the first fluid conduit which is fluidly interconnected therewith, or both. In this regard, the first valve assembly also includes a first service port which extends within the first valve body, which is fluidly interconnected with the second chamber of the first valve body both prior to and after any rupturing up the first barrier assembly, and which receives a first service valve therein. A service port and service valve could similarly be provided for the first chamber of the first valve body as well and for generally similar purposes.

The second valve assembly is preferably structurally similar to the first valve assembly as described, although as will be noted below the location of the service port which is required for the second valve assembly of the second aspect differs from the location of the service port which is required for the first valve assembly of the second aspect. Whereas "first" was generally used above to describe structure associated with the first valve assembly, "second" will generally be used to describe structure associated with the second valve assembly. Prior to a removal of the isolation between the first and second chambers of the second valve assembly by the second barrier rupture assembly, it may be desirable to utilize the second valve assembly to direct a flow through a flowpath which includes the first chamber of the second valve assembly, second inlet, and the second fluid conduit which is fluidly interconnected therewith, through a flowpath which includes the second chamber, second outlet, and a fluid conduit which may be fluidly interconnected therewith, or both. In this regard, the second valve assembly also includes a second service port which extends within the first valve body, which is fluidly interconnected with the first chamber of the second valve body both prior to and after any rupturing up the second barrier assembly, and which receives a second service valve therein. A service port and service valve could similarly be provided for the second chamber of the second valve body as well and for similar purposes. Therefore, the "first service port" associated with the first valve assembly is associated with its corresponding second chamber, while the "second service port" associated with the second valve assembly is associated with its corresponding first chamber.

Various refinements exist of the features noted in relation to the second aspect of the present invention. Further features may also be incorporated in the second aspect of the present invention as well. These refinements and additional features may exist individually or in any combination. For instance, the above-noted first aspect of the present invention may be used in combination with the subject second aspect of the present invention as noted. Moreover, the various characteristics of the valve assembly discussed above in relation to the first aspect of the present invention may be used in one or both of the first and second valve assemblies associated with the second aspect of the present invention as well.

The first fluid vessel of the second aspect of the present invention may be an expandable and contractable structure (e.g., bellows-like), the second fluid vessel may be a least substantially rigid, and the first fluid vessel may be disposed within the second fluid vessel. This arrangement is particularly suited for a rocket fuel application. Rocket fuel within the second fluid vessel may be discharged therefrom by directing an appropriate fluid into the first fluid vessel to expand the same, and thereby reduce the volume of the second fluid vessel which is available for rocket fuel storage. This may happen in a number of different situations. One such situation is when it is desired to unload the rocket fuel from the second fluid vessel for purposes other than operation of a rocket engine module(s) which may be fluidly interconnected with the second fluid vessel. With the first barrier assembly of the first valve assembly and the second barrier assembly of the second valve assembly being intact (to isolate their respective first chambers from their respective second chambers), an appropriate fluid may be directed through the first service valve associated with the first valve assembly, within the second chamber, through the first outlet of the first valve assembly since the first barrier assembly is still isolating the first chamber of the first valve assembly from the second chamber of the first valve assembly, through the first conduit, and into the first fluid vessel. Provision of the fluid to the first fluid vessel in this manner forces rocket fuel within the second fluid vessel out through the second fluid conduit, into the second inlet of the second valve assembly, and through the second service valve associated with the second valve assembly since the second barrier assembly is still isolating the first chamber of the second valve assembly from the second chamber of the second valve assembly. This rocket fuel may then be directed by an appropriate conduit to an appropriate rocket fuel supply/storage system or the like. These same flowpaths may be utilized for loading fuel within the second fluid vessel as well, although in the reverse direction to that noted above.

Another situation where rocket fuel may be discharged from the second fluid vessel is during operation of one or more rocket engine modules. In this regard, an appropriate fluid supply system (e.g., a pressurized pneumatics system) may be fluidly interconnected with the first inlet associated with the first valve assembly, while the noted rocket engine module(s) may be fluidly interconnected with the second fluid vessel through the second fluid conduit and possibly an intermediate fuel tank. Both the first and second barrier rupture assemblies may be activated to allow communication between the first and second chambers of the first valve assembly, and further to allow communication between the first and second chambers of the second valve assembly. As such, fluid from the above-noted fluid supply system would be directed through an appropriate fluid conduit to the first inlet of the first valve assembly, through the first chamber of the first valve assembly, through the now ruptured first barrier assembly, through the second chamber of the first valve assembly, through the second outlet of the first valve assembly, and through the first fluid conduit to the first fluid vessel which will have the above-noted effect on the rocket fuel within the second fluid vessel. The discharge of rocket fuel from the second fluid vessel in this case will be directed through the second fluid conduit, through the second inlet of the second valve assembly, through the first chamber of the second valve assembly, through the now ruptured second barrier assembly of the second valve assembly, through the second chamber of the second valve assembly, through the second outlet of the second valve assembly, and through an appropriate conduit and again possibly an intermediate fuel tank to the noted rocket engine module(s).

As noted above, the principles of the first aspect of the present invention may be used in combination with the subject second aspect of the present invention. In this regard and continuing with the above-noted rocket fuel application of the second aspect of the present invention, the system of the second aspect may further include a rocket fuel tank and at least one rocket engine module. The second fluid conduit associated with the second aspect would extend from the second fluid vessel to the second inlet of the second valve assembly, a third fluid conduit would extend from the second outlet of the second valve assembly to the rocket fuel tank, and each rocket engine module would be fluidly interconnected with the rocket fuel tank. Therefore, rocket fuel stored in the second fluid vessel would flow through the second fluid conduit, through the second valve assembly, through the third fluid conduit, and to the rocket fuel tank for use by the rocket engine module(s) when the barrier assemblies associated with the first and second valve assemblies were activated in the above-noted manner. Prior to this activation, the second valve assembly may be utilized to provide a flow between the second fluid vessel and a rocket fuel tank, and vice versa, in a manner which will now be described.

The second valve assembly may include a service port which extends within the second valve body to interface with the second chamber of the second valve assembly as noted above. A third service valve may be disposed within this particular service port so as to be fluidly interconnected with the second outlet of the second valve assembly through the second chamber prior to removal of the isolation between the first and second chambers of the second valve assembly. This third service valve may be used to direct a flow from a fluid supply system to the rocket fuel tank, and vice versa, in the manner addressed above in relation to the first aspect of the present invention (e.g., to provide an appropriate gas to the rocket fuel tank and/or rocket fuel engine modules to keep the same "clean").

A third aspect of the present invention is directed to a valve which includes a valve body, as well as an inlet and an outlet which extend within the valve body. A pair of chambers are disposed within the valve body. One of these chambers is fluidly interconnected with the inlet, while the other of these chambers is fluidly interconnected with the outlet. A barrier assembly isolates these chambers until a flow through the valve is desired. In this regard, the third aspect further includes a barrier rupture assembly for removing this isolation at the desired time, which in turn will allow a flow to proceed from the inlet of the valve body, through the first chamber, through the ruptured barrier assembly, through the second chamber, and through the outlet of the valve body. Additional flows may be affected by the valve prior to a rupturing of its barrier assembly. In this regard, at least one service port extends within the valve body and is fluidly interconnected with one of the noted chambers, while at least one service port extends within the valve body and is fluidly interconnected with the other of these chambers. Service valves may be positioned within the service ports to direct a flow through only part of the valve prior to removal of the isolation between the noted chambers, and in the manner discussed above in relation to both the first and second aspects of the present invention. Features discussed above in relation to the valve assemblies encompassed by the first and second aspects may be used in this third aspect as well.

A fourth aspect of the present invention relates to a service valve which provides for either a "flow through" or "no flow" condition in relation to the service valve, and which may be utilized in either of the first, second, and/or third aspects of the present invention discussed above as well. There are a number of important characteristics which may be associated with the service valve of the subject fourth aspect due to one or more configurations of the same to be discussed in more detail below. One such characteristic is that the service valve of the fourth aspect need not utilize metal-to-metal seals of any kind, but instead may utilize at least one and more preferably a plurality of spaced radial seals. Another characteristic which may be incorporated into the service valve of the subject fourth aspect is that may be configured so as to provide resistance to side loads, preferably in a manner which avoids any contact between a valve body and a valve stem movably disposed therein. Yet another characteristic which may be incorporated into the service valve of the subject fourth aspect is that may utilize redundant seals on redundant sealing surfaces.

A first embodiment of the fourth aspect of the present invention includes a valve body with a valve body bore therewithin. This valve body is integrally formed in that is formed from a single piece of material such that there is no joint of any kind therewithin, at least in relation to those surfaces of the valve body which define at least certain portions of its bore. Disposed within this valve body bore is a valve stem which is movable between at least two positions. One of these valve stem positions allows for a flow through the service valve (a "flow through" condition), while the other of these valve stem positions precludes any such flow through the service valve (a "no flow" condition). Flow through the service valve may be provided by fluidly interconnecting the valve body bore with a valve stem bore which may extend through the valve stem. In this case the two noted conditions may be affected by providing a removable cap for an end of the valve stem which extends beyond the valve body. When the cap covers the valve stem bore, the service valve is in its "no flow" condition. Conversely, when the cap "uncovers" or is off the valve stem bore, the service valve is in its "flow through" condition. There may be other ways to affect a "flow through" and a "no flow" condition for the service valve by movement of the valve stem through the valve body.

Movably interconnecting the valve body and valve stem introduces a first leakpath between these two structures. In one embodiment this is the only leakpath within the service valve of the subject first embodiment of the fourth aspect of the present invention. Flow along/through this first leakpath is addressed by a plurality of radial seals which are spaced along an extent of this first leakpath. Each of these radial seals may be mounted on either the valve body or the valve stem. At least three radial seals engage both the valve body and valve stem, when the valve stem is positioned to provide a "no flow" condition for the service valve, so as to at least impede, and more preferably to terminate, any flow into/along the first leakpath at three spaced locations. At least two radial seals engage both the valve body and valve stem, when the valve stem is positioned to provide a "flow through" condition for the service valve, so as to at least impede, and more preferably to terminate, flow into/along at least a portion of the first leakpath at two spaced locations.

Various refinements exist of the features noted in relation to the first embodiment of the fourth aspect of the present invention. Further features may also be incorporated in the first embodiment of the fourth aspect of the present invention as well. These refinements and additional features may exist individually or in any combination. The bore within the valve body may be defined by an inner wall which includes first, second and third wall sections. Each of these three wall sections defines a portion of a length dimension of the bore, with each preferably then being at least generally longitudinally extending. These first, second, and third wall sections may be disposed in end-to-end relation, or there may be intermediate structure between the first and second wall sections and/or between the second and third wall sections, such as an appropriately configured transition section (e.g., a chamfered surface). In any case, the second wall section is disposed at least somewhere longitudinally between the first and third wall sections.

Each of the above-noted second and third wall sections may be at least generally cylindrical surfaces of different diameters. The first wall section may also be a cylindrical surface and may be of a different diameter than the second wall section. One embodiment has the first wall section at a smaller diameter than the second wall section, and the second wall section at a smaller diameter than the third wall section. In any case, a first radial seal may be disposed between and engage both the first wall section of the valve body and valve stem when the valve stem is in positioned to provide a "no flow" position for the service valve, but may be disengaged with one of the first wall section of the valve body and valve stem so as to provide for a flow through the service valve by an appropriate movement of the valve stem relative to the valve body to another position. Engagement of first radial seal with both the first wall section of the valve body and valve stem may be characterized as defining the valve seat of the first embodiment of this fourth aspect of the present invention. A second radial seal may at all times be disposed between and engaged with both the second wall section of the valve body and the valve stem, while a third radial seal may all times be disposed between and engaged with both the third wall section of the valve body and the valve stem. The second and third radial seals provide a redundant sealing feature, for blocking the first leakpath between the valve body and the valve stem, in both the "flow through" and "no flow" conditions for the service valve. The effectiveness of having these redundant seals is enhanced by having the second and third wall sections be of different diameters. This significantly reduces the potential for an imperfection existing within the inner wall which defines the bore and which would adversely affect the ability of both the second and third radial seals to effectively terminate further flow downstream thereof through the first leakpath.

Having a plurality of longitudinally spaced radial seals between and in engagement with each of the valve body and the valve stem provides benefits other than redundant seals. These same seals also provide another function, that of maintaining the valve body and valve stem in spaced relation. Preferably, the valve body and valve stem are maintained in spaced relation even when the service valve of the subject first embodiment of the fourth aspect is exposed to a shear or side load. For instance, the valve body and valve stem may be maintained in spaced relation (i.e., so as to avoid contact therebetween), when a radially-directed side load (i.e., at least somewhat transverse to the longitudinal extent of the valve) of at least about 25 pounds is applied to the service valve, such as a portion of the valve stem which may extend beyond the valve body. Application of a side load to the valve stem, when the valve stem is disposed relative to the valve body to provide a "no flow" condition for the service valve, may result in at least one of these radial seals functioning as a fulcrum so as to keep/prevent the valve stem from contacting the valve body. Another radial seal(s) may function as fulcrum(s) so as to keep/prevent the valve stem from contacting the valve body when a side load is applied to the valve stem with the valve stem being disposed relative to the valve body to provide a "flow through" condition for the service valve. Consider the example presented above where the plurality of radial seals were noted to possibly include first, second, and third radial seals. The second and/or third radial seals may each function as such a fulcrum when the valve stem is disposed to provide a "flow through" condition for the service valve, while the first radial seal may function as such a fulcrum when the valve stem is disposed to provide a "no flow" condition for the service valve.

A second embodiment of the fourth aspect of the present invention includes a valve body with an at least generally longitudinally extending valve body bore in which a valve stem is movably disposed so as to provide for both a "flow through" and a "no flow" condition for the service valve. The bore within the valve body is defined by an inner wall. Multiple and distinct longitudinal segments or wall sections define this bore-defining inner wall. First, second, and third wall sections of the inner wall each have a longitudinal extent or length dimension, and may be disposed in end-to-end relation or there may be intermediate structure between the first and second wall sections and/or between the second and third wall sections, such as an appropriately configured (e.g., chamfered) transition section. In any case, the second wall section is disposed at least somewhere longitudinally between the first and third wall sections.

Each of the above-noted second and third wall sections of the subject second embodiment of the fourth aspect are at least generally cylindrical surfaces of different diameters. The first wall section may also be a cylindrical surface and may be of a different diameter than the second wall section. One embodiment has the first wall section at a smaller diameter than the second wall section and the second wall section at a smaller diameter than the third wall section for a case where the valve stem is moved in a direction which is at least generally longitudinally away from the first wall section to provide a "flow through" condition for the service valve. In any case and including this later variation, a first radial seal is disposed between and engages both the first wall section of the valve body and valve stem when the valve stem is disposed to provide a "no flow" condition for the service valve, but is disengaged with one of the first wall section of the valve body and valve stem so as to provide for a flow within/through the service valve by an appropriate movement of the valve stem relative to the valve body. Engagement of the first radial seal with both the first wall section of the valve body and valve stem may then be properly characterized as defining the valve seat of the subject second embodiment of this fourth aspect of the present invention. A second radial seal is at all times disposed between and engages both the second wall section of the valve body and the valve stem, while a third radial seal is at all times disposed between and engages both the third wall section of the valve body and the valve stem.

The above-noted second and third radial seals provide redundancy for blocking a leakpath between the valve body and the valve stem, in both the "flow through" and "no flow" conditions for the service valve. The effectiveness of this redundancy is enhanced by having the second and third wall sections be of different diameters. That is, this configuration significantly reduces the potential for an imperfection existing within the inner wall which defines the bore within the valve body and which would adversely affect the ability of both the second and third radial seals to effectively terminate further flow downstream thereof in an area between the inner wall of the valve body and the valve stem.

Each of those features discussed above in relation to the first embodiment of the subject fourth aspect may be used individually or in any combination in this second embodiment of the fourth aspect as well.

A third embodiment of the fourth aspect of the present invention includes a valve body with a valve body bore therewithin. Disposed within this valve body bore is a valve stem which is movable between at least two positions. One of these valve stem positions allows for a flow through the service valve, while the other of these valve stem positions precludes any such flow through the service valve. Movably interconnecting the valve body and valve stem introduces a first leakpath between these two structures, which is the only leakpath within the service valve in the case of the third embodiment of the subject fourth aspect. Flow along/through this first leakpath is addressed by a plurality of radial seals which are spaced along an extent of this first leakpath. Each of these radial seals may be mounted on either the valve body or the valve stem. At least three radial seals engage both the valve body and valve stem when the valve stem is disposed to provide a "no flow" condition for the service valve. These 3 radial seals thereby function to at least impede, and more preferably to terminate, any flow into/along the first leakpath at least at three spaced locations when no flow is being directed through the service valve. At least two radial seals engage both the valve body and valve stem when the valve stem is disposed to provide a "flow through" condition for the service valve. These 2 radial seals thereby function to at least impede, and more preferably to terminate, flow into/along at least a portion of the first leakpath at two spaced locations while there is flow through the service valve.

Each of those features discussed above in relation to the first embodiment of the subject fourth aspect may be used individually or in any combination in this third embodiment of the fourth aspect as well.

A fourth embodiment of the fourth aspect of the present invention includes a valve body with a valve body bore therewithin. Disposed within this valve body bore is a valve stem which is movable between at least two positions. One of these valve stem positions allows for a flow through the service valve, while the other of these valve stem positions precludes any such flow through the service valve. Movably interconnecting the valve body and valve stem introduces a first leakpath between these two structures. Flow along/through this first leakpath is addressed by a plurality of radial seals which are spaced along an extent of this first leakpath. Each of these radial seals may be mounted on either the valve body or the valve stem. At least three radial seals engage both the value body and valve stem when the valve stem is disposed to provide a "no flow" condition for the service valve. These 3 radial seals thereby function to at least impede, and more preferably to terminate, any flow into/along the first leakpath at least at three spaced locations when no flow is being directed through the service valve. At least two radial seals engage both the valve body and valve stem when the valve stem is disposed to provide a "flow through" condition for the service valve. These 2 radial seals thereby function to at least impede, and more preferably to terminate, flow into/along at least a portion of the first leakpath at two spaced locations while there is flow through the service valve. In addition to providing the noted sealing function, the plurality of radial seals also maintain the valve body and valve stem in spaced relation.

Each of those features discussed above in relation to the first embodiment of the subject fourth aspect may be used individually or in any combination in this fourth embodiment of the fourth aspect as well.

DETAILED DESCRIPTION OF THE INVENTION

Figure 1:
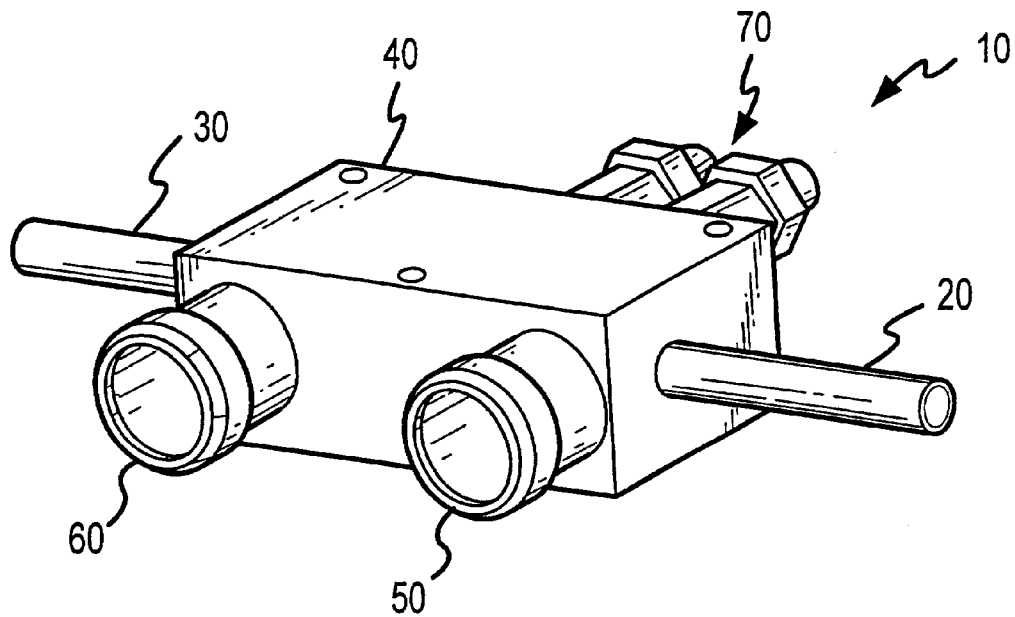
FIG. 1 is a perspective view of one embodiment of a multifunctional valve with multiple flowpaths therethrough.
Figure 2:
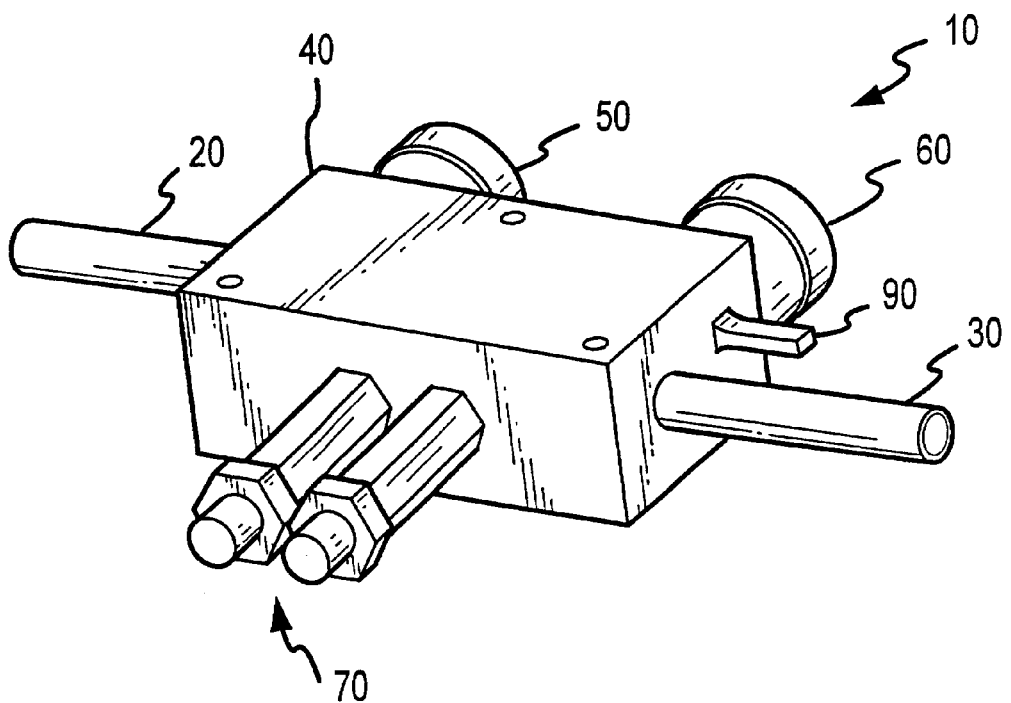
FIG. 2 is another perspective view of the multifunctional valve of FIG. 1.
Figure 3:
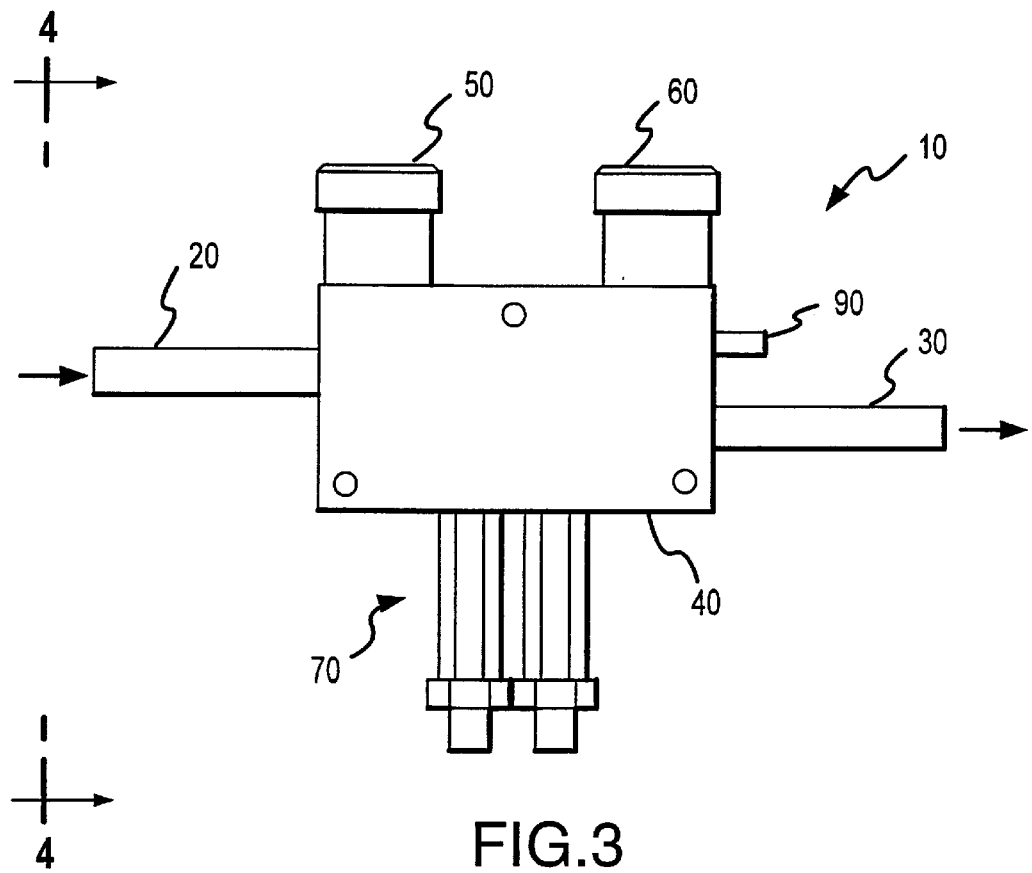
FIG. 3 is a top view of the multifunctional valve of FIG. 1.
Figure 4:
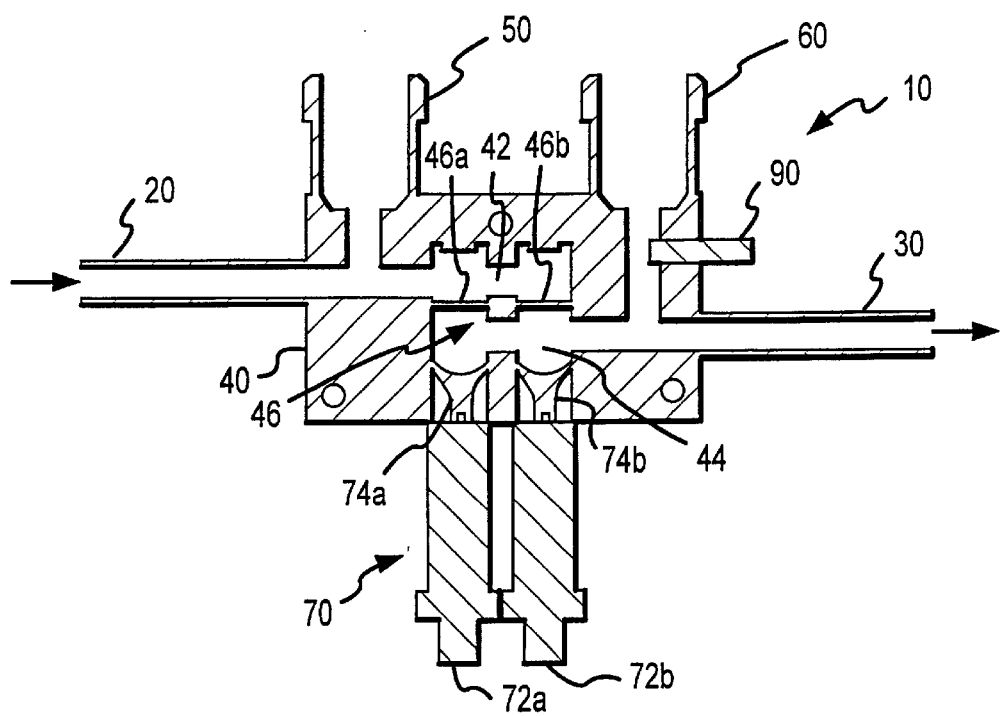
FIG. 4 is a cross-sectional view of the multifunctional valve of FIG. 3, taken along line 4—4.

The present invention will now be described in relation to the accompanying drawings which at least assist in illustrating its various pertinent features. FIGS. 1–4 illustrate one embodiment of the multifunctional valve 10. Generally, the valve 10 functions to allow fluid to flow from one side of the valve to the other side of the valve at a desired or selected time. Such a valve is particularly useful in launch vehicle or spacecraft applications where highly volatile fluids (e.g., hypergolic fluids, such as hydrazine) are utilized. Such valves 10 also facilitate servicing of certain components of reaction control systems of which the valves of the present invention are included. More specifically, in one embodiment, illustrated in FIGS. 1–4, the valve 10 includes inflow and outflow tubes or flow passageways 20, 30, respectively, adapted to allow a fluid to flow therethrough, a valve body 40 having first and second chambers or cavities 42, 44, respectively, which are in fluid communication with the inflow and outflow passageways 20, 30, respectively, the first and second cavities 42, 44 being defined in part by a first wall or partition or barrier assembly 46, first and second service ports 50, 60, respectively capable of receiving first and second service valves through which a fluid may be flowed inwardly or outwardly relative to the valve 10, depending upon the application, and a barrier rupture or separation assembly 70 for opening the valve 10 to allow fluid to flow through the valve 10, and specifically, from the first cavity 42 to the second cavity 44 of the valve body member 40, such that the inflow and outflow passageways 20, 30 are in fluid communication with each other via the valve body member 40 after initiation of the separation assembly 70.

In particular, the first partition 46 initially functions to inhibit fluid communication between the first and second chambers or cavities 42, 44, respectively, until ruptured, separated, or severed by the separation assembly 70. As such, the first partition 46 allows certain components in fluid communication with the valve 10 to be serviced via the first and/or second service ports 50, 60 and service valves which are engagable with such service ports 50, 60 (which will be described in more detail hereinbelow). In this embodiment, the separation wall or partition 46 comprises first and second sections 46a, 46b which are integrally formed with the valve body member 40. In an alternative embodiment, the separation wall 46 may comprise a single wall separating the first and second cavities or chambers 42, 44. In order to provide for fluid communication between the first and second cavities 42, 44 upon initiation of the separation assembly 70, in the present embodiment, the separation assembly 70 includes first and second trigger bodies 72a, 72b each having an initiator and a cartridge with an explosive charge, and first and second rams 74a, 74b which, upon initiation and explosion of the trigger bodies 72a, 72b, are rammed against the first and second sections 46a, 46b, respectively, of the separation wall 46 to rupture, separate or break the first and second sections 46a, 46b, respectively, to thereby allow fluid communication between the first and second cavities 42, 44. Valve 10 includes first and second trigger bodies 72a, 72b and corresponding rams 74a, 74b for purposes of redundancy (e.g., in the event one of the trigger bodies 72a, 72b fails to fire, the other breaks the corresponding separation wall 46a, 46b to achieve fluid communication between the first and second cavities 42, 44). However, a single trigger body and a single ram may be utilized to fluidly connect the first and second cavities 42, 44, to thereby allow fluid to flow from the inflow tube 20 to the outflow tube 30.

Figure 5:
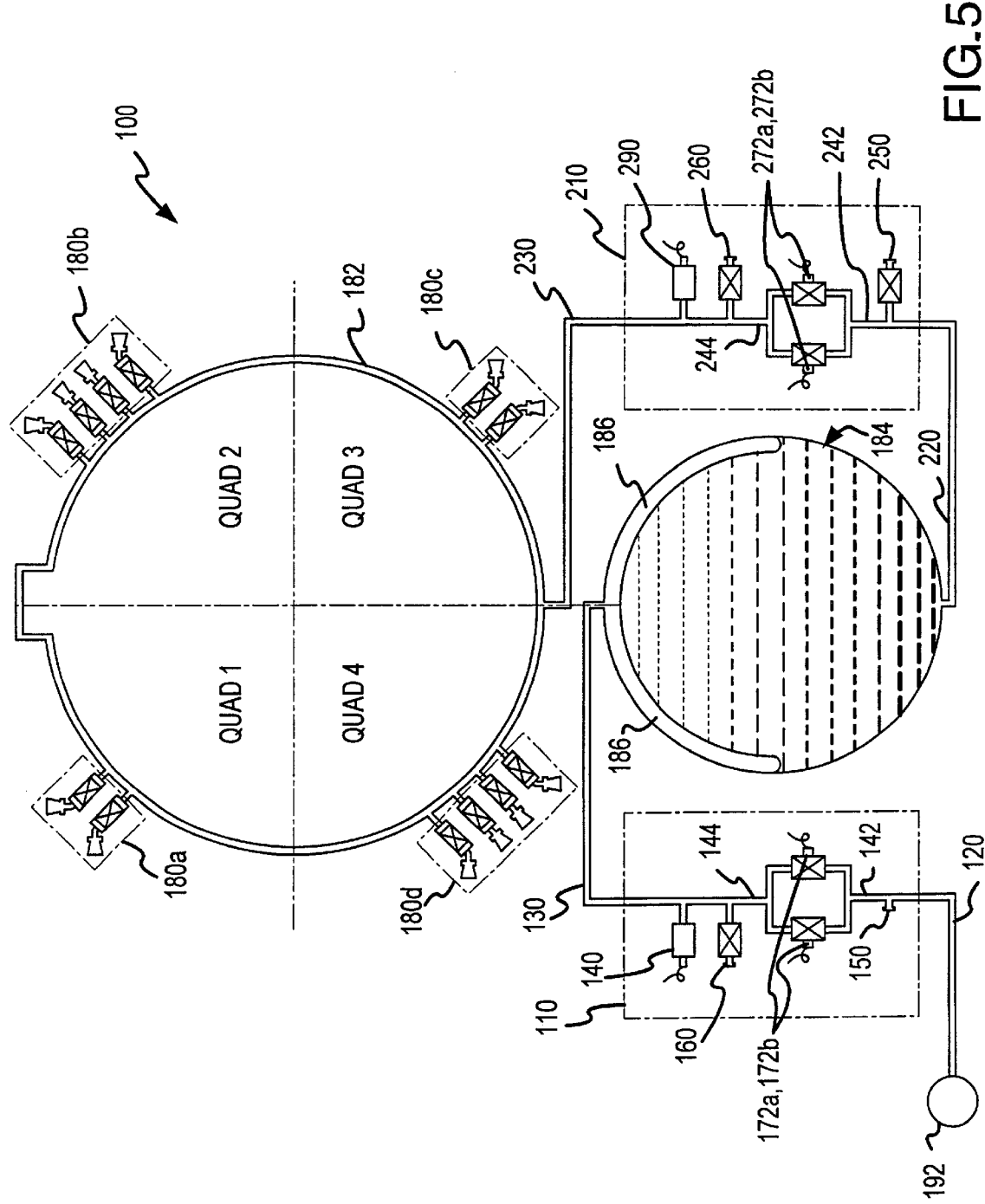
FIG. 5 is a schematic of one embodiment of a reaction control system which includes a number of multifunctional valves of the type presented in FIGS. 1–4.
Figure 6:
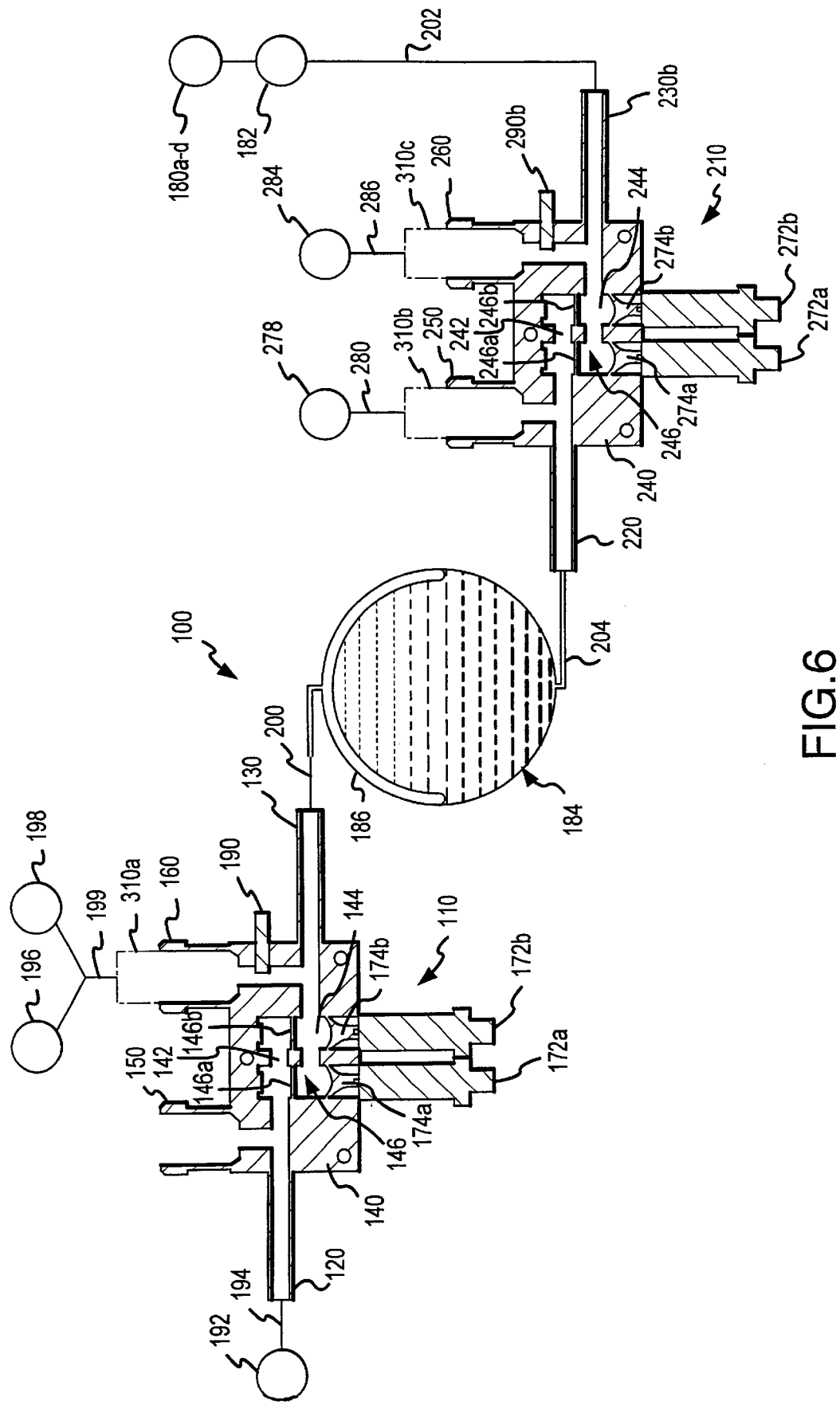
FIG. 6 is another schematic of the embodiment of the reaction control system presented in FIG. 5.
Figure 7:
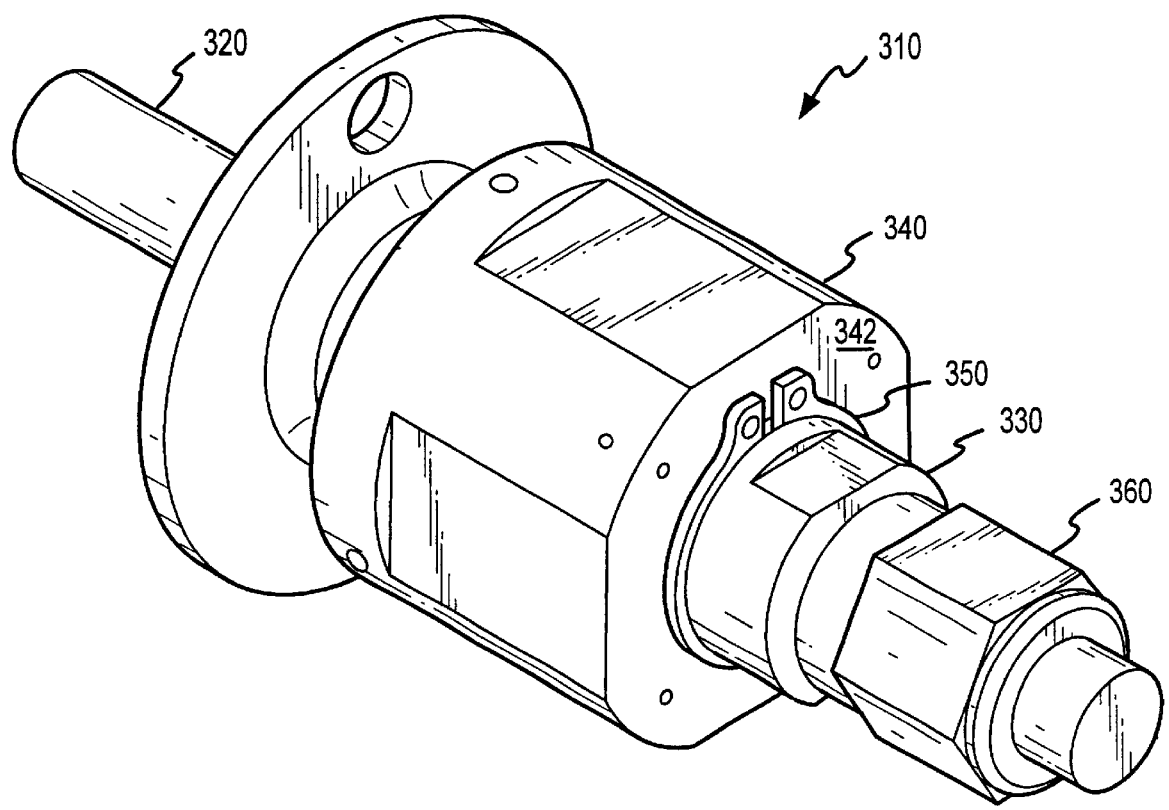
FIG. 7 is a perspective view of one embodiment of a service valve which may be used in the reaction control system of FIGS. 5–6.
Figure 8:
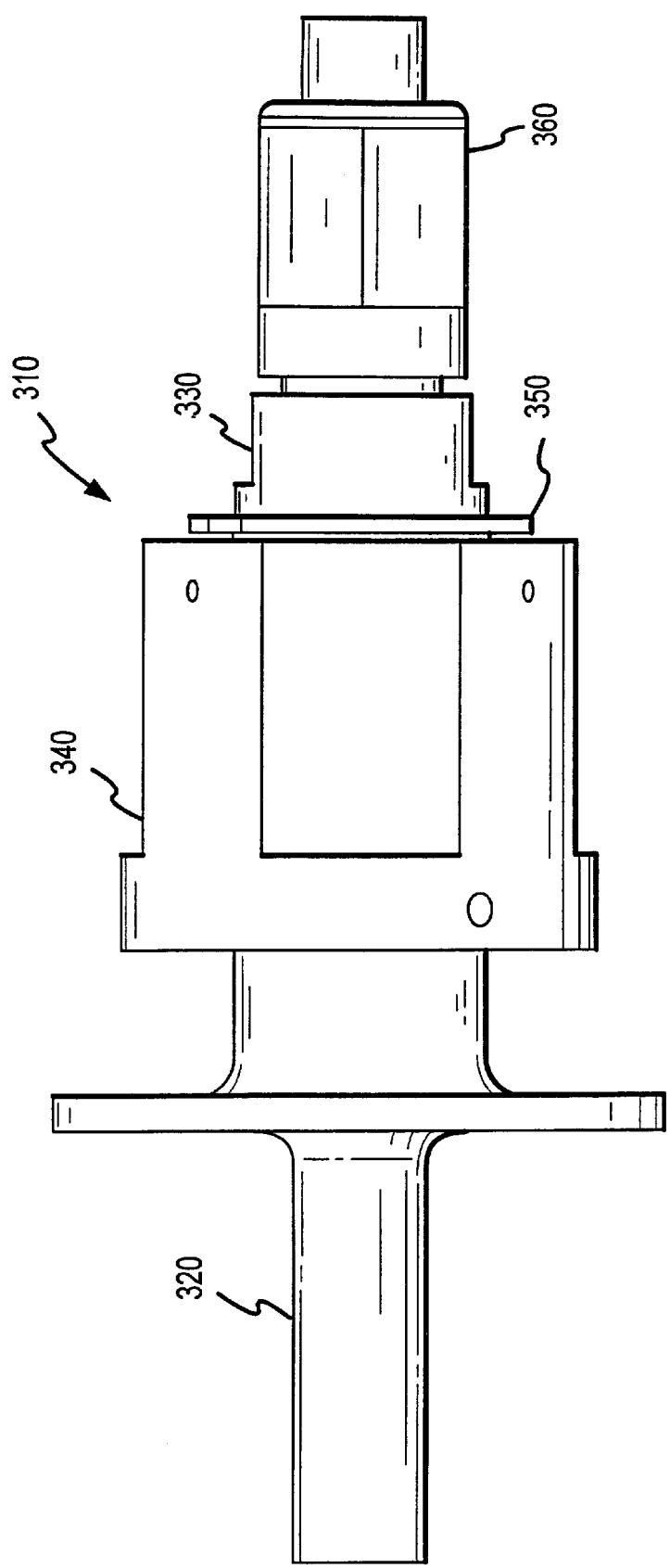
FIG. 8 is a side view of the service valve of FIG. 7.
Figure 9:
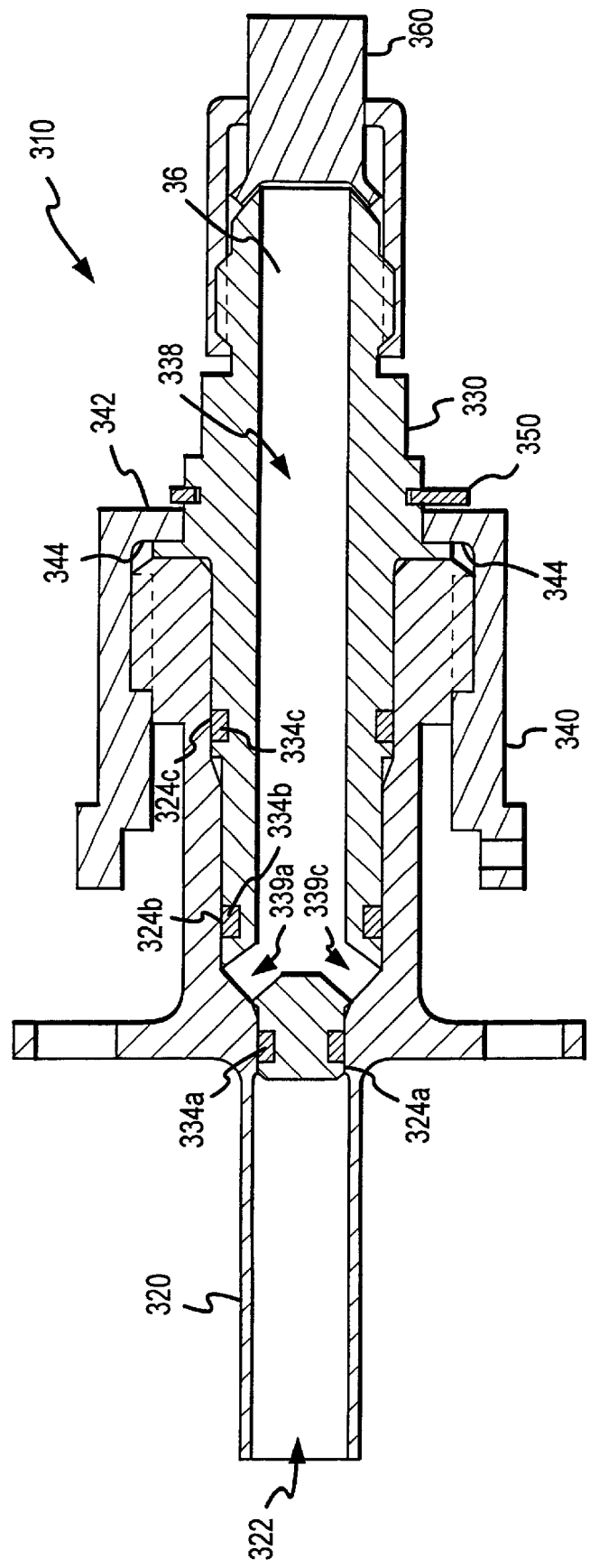
FIG. 9 is a cross-sectional view of the service valve of FIG. 7, taken along its longitudinal extent.
Figure 10:
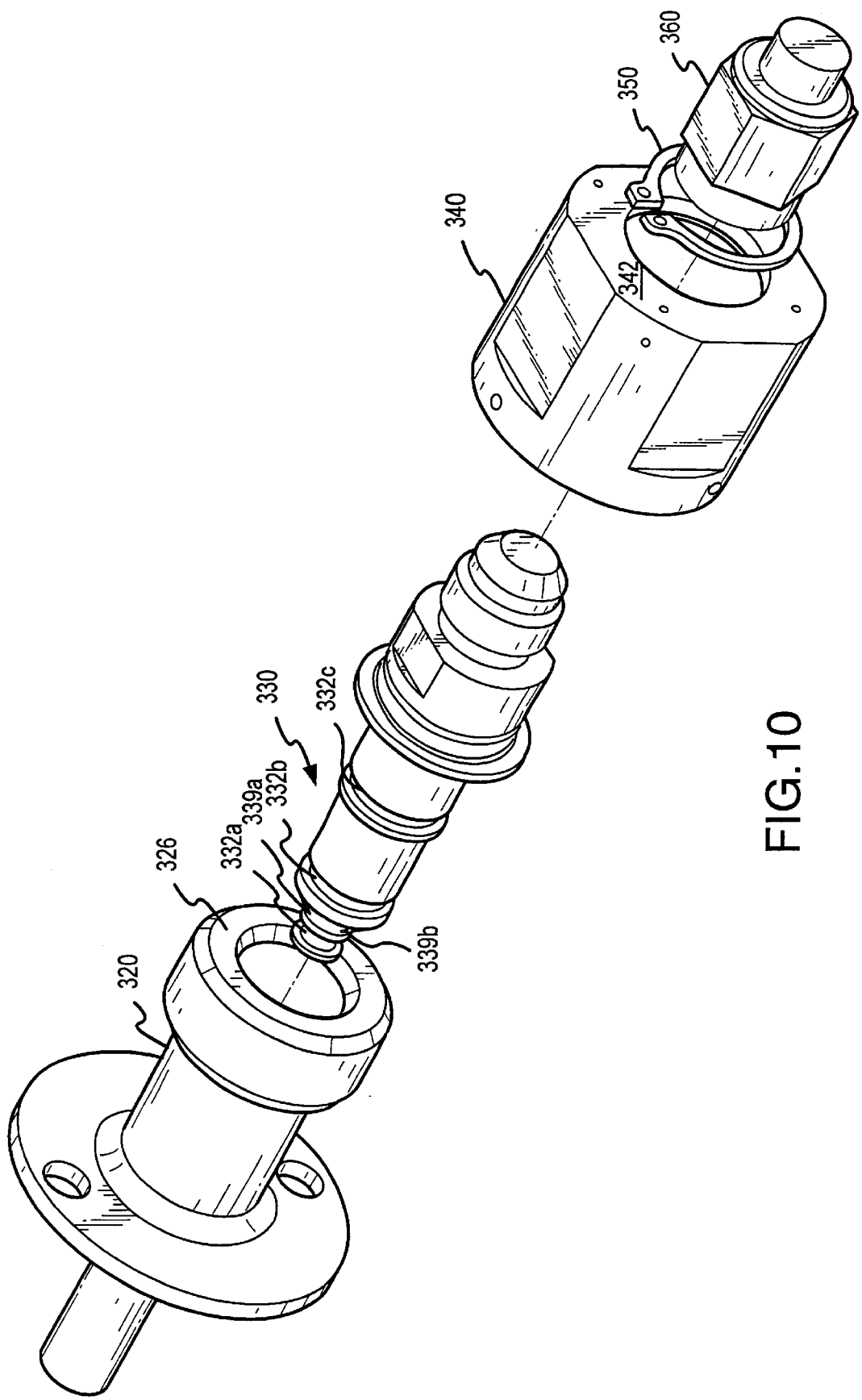
FIG. 10 is an exploded, perspective view of the service valve of FIG. 7.

As indicated hereinabove, the valve 10 may be utilized in certain launch vehicle and spacecraft applications, and in particular, for reaction control service systems associated with such. For example, the multifunctional valve may be utilized in an upper stage, which is utilized to steer a spacecraft after separation of the spacecraft from the launch vehicle or booster rocket. In one embodiment, the schematic of which is illustrated in FIGS. 5–6, a first multifunctional valve 10 (similarly structured to the valve 10) functions as a pneumatic valve adapted to at least pressurize and/or depressurize an ullage bottle 186 of a storage bottle 184 capable of storing a fluid, such as a rocket fuel (e.g., hydrazine). A second multifunctional valve 210 (similarly structured to the valve 10) is positionable downstream the storage bottle 184 and functions as a liquid valve to at least fill and/or remove such fluid, such as hydrazine, from the storage bottle 184. More specifically, the valve 110 positioned upstream of the storage bottle 184 is adapted to assist in the servicing of the storage bottle 184 and to pressurize such storage bottle 184 upon initiation or firing of the valve 110 in order to force the fluid contained within the storage bottle 184 to flow to a tank 182 via the liquid valve 210, which will be described in more detail hereinbelow.

The valve 110 includes a valve body member 140 having first and second chamber 142, 144, respectively, which are in fluid communication with inflow and outflow tubes or passageways 120, 130. The inflow passage 120 is interconnectable to (e.g, in fluid communication with) a fluid supply system 192 by a conduit 194. The fluid supply system 192 is capable of supplying a fluid, such as a gas (e.g., pressurized gaseous helium), to the ullage bottle 186 upon initiation of the valve 110 via the outflow passageway 130 and a fluid conduit 200 which extends between and fluidly interconnects the outflow passageway 130 and the ullage bottle 186. The valve 110 further includes triggers or initiators 172a, 172b which, when fired, open the valve 110 so that fluid, such as the pressurized gaseous helium from the fluid supply system 192 (e.g., helium source) may flow from through the valve 110 into the ullage bottle 186. In this regard, the valve 110 also includes at least a first wall or partition 146 (which includes first and second sections 146a, 146b, again principally for redundancy) between the first and second cavities 142, 144 which breaks, separates, or otherwise ruptures upon firing of the triggers or initiators 172a, 172b to open the valve 110 (i.e., to remove the isolation between the first chamber 142 and the second chamber 144). For launch vehicle and spacecraft applications, such initiation or firing typically occurs after the launch vehicle has separated from the spacecraft and associated upper stage, the reaction control system 100 illustrated in FIGS. 5–6 being associated with such upper stage.

For purposes of allowing servicing of the pneumatic portion of the system 100 prior to launching of such a spacecraft (e.g., on the launch pad), the valve 110 includes a service port 160 which is associated with the second chamber 144 and which is used to pressurize and/or depressurize the ullage bottle 186 (a service port 150 of the valve 110 is associated with the first chamber 142, and is not used by the reaction control system 100). For instance, in a ground environment, prior to the launch, a vacuum system 196 may be interconnected to the service port 160 via a fluid conduit 199 and a service valve 310a which is disposed within the service port 160. A preferred configuration for the service valve 310a is described in more detail below in relation to FIGS. 7–10. Other configurations of services valves 310a could be used by the reaction control system 100. For instance, commercially available valves from Moog and OEA, Inc., which utilize a metal-to-metal seal (e.g., metal ball against a metal channel) to close or seal the valve could be used as well.

The vacuum system 196 may be activated to create a vacuum in the ullage bottle 186 to assist in the filling of the storage bottle 184 with the selected fluid, such as hydrazine, such fluid being introduced into the storage bottle 184 via a service port 250 associated with the liquid valve 210 as will be discussed below. Isolation of the first chamber 142 from the second chamber 144 in this case allows a vacuum to be drawn using a flowpath which includes the ullage bottle 186, the fluid conduit 200, the outflow tube 130, the second chamber 144, the service valve 310a, and the fluid conduit 199 (i.e., this particular flowpath does not include the first chamber 142 since the same is still isolated from the second chamber 144 in this instance). The service port 160 may also be utilized to pressurize the ullage bottle 186 to unload or empty the fluid (e.g., hydrazine) from the storage bottle 186 (e.g., in a ground environment, and prior to launch), whereby the ullage bottle 186 is caused to expand within the storage bottle 184 to force the fluid out of the storage bottle 184 via the service port 250 associated with the valve 210 as will be discussed below. In this regard, the reaction control system 100 further includes a first fluid supply/storage system 198 (e.g., a supply of an appropriate pressurized fluid such as helium) which is also fluidly interconnected with the service valve 310a, and thereby the second chamber 144 of the valve 110, via the fluid conduit 199. Isolation of the first chamber 142 from the second chamber 144 in this case allows an appropriate pressurized fluid to be directed from the first fluid supply/storage system 198 to the ullage bottle 184 through a flowpath which includes the fluid conduit 199, the service valve 310a, the second chamber 144, the outflow tube 130, and the fluid conduit 200 (i.e., this particular flowpath does not include the first chamber 142 since the same is still isolated from the second chamber 144 in this instance).

As noted hereinabove, the multifunctional valve 210 may also be utilized to allow the transfer of a fluid, such as hydrazine, from the storage bottle 186 into a tank bottle 182 via a fluid conduit 204, the valve 210, and a fluid conduit 202. In spacecraft applications, the tank bottle 182 may be in fluid communication with a plurality of rocket engine modules 180a–180d which may be utilized on the upper stage to steer such upper stage when fired (e.g., after separation of the upper stage and spacecraft interconnected thereto from the launch vehicle or booster rocket). In order to facilitate such a transfer of fluid within the storage bottle 184 into the tank bottle 182 for use by the rocket engine modules 180a–180d, the multifunctional valve 210 includes triggers or initiators 272a, 272b which are adapted to drive first and second rams 274a, 274b, respectively, into at least a first separation wall or partition 246 (which again includes first and second sections 246a, 246b, principally for redundancy). The first separation wall 246 isolates first and second cavities 242, 244 within the valve body 240 of the valve 210, with the first chamber or cavity 242 always being fluidly interconnected with an inflow tube or passageway 220 of the valve 210, and with the second chamber or cavity 244 always being fluidly interconnected with an outflow tube or passageway 230 of the valve 210. The first partition 246 thus inhibits fluid flow through the valve 210 until broken or otherwise ruptured by the first and/or second rams 274a, 274b (e.g., upon firing of the initiators 272a, 272b)). As noted hereinabove with respect to another embodiment, like the valve 110, the valve 210 includes first and second initiators 272a, 272b, respectively, for redundancy in the event one of the initiators or triggers fails to fire. In use, upon simultaneous firing of the initiators 172a, 172b and 272a, 272b of the valves 110, 210, respectively, pressurized fluid (e.g., helium at 450 psi) from the fluid supply system 192 is allowed to enter and fill the ullage bottle 186 via the opened valve 110, which forces the hydrazine or other fluid contained within the storage bottle 184 to exit the storage bottle 184 and flow into the tank bottle 182 via the fluid conduit 204, the opened valve 210, and the fluid conduit 202 in order to make such fluid available for use by the rocket engine modules 180a–180d.

The valve 210 further includes a bottle liquid service port 250 which, in ground applications, allows the storage bottle 184 to be filled with hydrazine fluid or other fluids, and also allows such fluids to be removed from the storage bottle 184. In this regard, a service valve 310b is disposed within the service port 250. A fluid conduit 280 fluidly interconnects the service valve 310b with a fuel/supply storage system 278. Fluid may be transferred between the storage bottle 184 and the fuel supply/storage system 278, prior to activation of the valve 210 (i.e., with the first chamber 242 continuing to be fluidly isolated from the second chamber 244), through a flowpath which thereby includes the fluid conduit 280, the service valve 31b, the first chamber 242, the inflow passageway 220, and the fluid conduit 204 (i.e., this particular flowpath does not include the second chamber 244 since the same is still isolated from the first chamber 244 in this instance).

The valve 210 further includes a loop service port 260 which is adapted to introduce a fluid, such as gaseous nitrogen, into the tank bottle 182 to keep the tank bottle 182 and/or rocket engine modules 180a–180d clean. The loop service for 260 may also be utilized to remove the gaseous nitrogen from the tank bottle 182 as well. In this regard, a service valve 310c is disposed within the service port 260. A fluid conduit 286 fluidly interconnects the service valve 310c with a second fluid supply/storage system 284. A appropriate fluid may be transferred between the fuel tank 182 rocket engine modules 180a–d and the second fluid supply/storage system 284, prior to activation of the valve 210 (i.e., with the first chamber 242 continuing to be fluidly isolated from the second chamber 244), through a flowpath which thereby includes the fluid conduit 286, the service valve 310c, the second chamber 244, the outflow passageway 230, and the fluid conduit 202 (i.e., this particular flowpath does not include the first chamber 242 since the same is still isolated from the first chamber 142 in this instance).

For purposes of providing analytical data, the multifunctional valves 110, 210 pressure transducers 190, 290 which are in fluid communication with the outflow passageways 130, 230, respectively, to measure the pressure of the fluid flowing out of the valves 110, 210, respectively. Other pressure transducers could be in fluid communication with the inflow passageways 120, 220, respectively, to measure the pressure of the fluid flowing into the valves 110, 210, respectively (not shown).

The multifunctional valves 110, 210 are particularly useful in the reaction control system 100 for initially inhibiting the flow of volatile fluids, such as hydrazine, into the tank bottle 182 and rocket engine modules 180a–180d since any leakage of such volatile fluids from the tank bottle 182 or rocket engine modules 180a–180d could adversely effect (e.g., corrode) portions of the launch vehicle or booster, or spontaneously explode upon contact with certain materials, (e.g., copper), and since such fluids may be poisonous. In this regard, the valves 110, 210 may be fabricated from a material which is compatible with hydrazine, such as corrosion resistant steel (e.g., 321 cres, 304 cres, 316 cres, etc.). The multifunctional valves 110, 210 may also be fabricated from other materials, such as polymers or Teflon, depending upon the application and fluid being utilized.

As noted hereinabove, service valves 310 may be interconnected to the ports (e.g., ports 50, 60 of the valve 10, ports 150, 160 of the valve 110, and ports 250, 260 of the valve 210) for purposes of servicing the reaction control system 100, or any other system interconnected to the multifunctional valves 10, 110, 310. Such service valves 310 generally function to allow and inhibit fluid communication (e.g., open and close) between a fluid source or receptacle, and the system being serviced (e.g., the reaction control system 100). One embodiment of the types of services valves 310a–c used by the above-noted reaction control system 100 is illustrated in FIGS. 7–10 in the form of the valve 310. The service valve 310 is operably interfacable with a body member 320 and generally includes a stem 330 which is slidably engagable with the body member 320, a nut member 340 for moving the stem 330 axially relative to the body member 320 to open and close the valve, in cooperation with a snap ring 350, and a cap 360 which is engagable with an end portion of the stem 330. More specifically, the body member 320 includes an axially extending channel 322 through which a fluid may flow when the valve 310 is open. In this embodiment, the channel 322 includes first, second and third stepped walls 324a, 324b, 324c having first, second and third diameters, respectively. Such walls 324a, 324b, 324c of the body member 320 are abuttingly engagable with first, second and third o-rings or sealing members 334a, 334b, 334c which are receivable within annular grooves 332a, 332b, 332c, respectively, of the stem 330. Such abutting engagement between the sealing members 334a, 334b, 334c with the stepped walls 324a, 324b, 324c of the body member 320, respectively, function not only to inhibit the flow of a fluid through the valve 310 (i.e., to close the valve 310), but also function to inhibit metal-to-metal contact between surfaces of the stem 330 and the body member 320 when subjected to shear loads. Such first, second and third seals 334a, 334b, 334c provide redundancy to inhibit leakage of a fluid there through. Such seals also function to preserve the cleanliness of the valve 310 since contaminants may react adversely when in contact with certain fluids, such as hydrozene. A fourth sealing mechanism is provided by the cap 360 which is threadedly engagable with an end portion of the stem 330. In one embodiment, where the service valve 310 will be interconnected to a multifunctional valve 10, 110, 210, the body member 320 may be integrally formed as part of the valves 10, 110, 210.

The sealing function is performed by redundant radially sealed o-rings (e.g., seals 334a–334c) on redundant sealing surfaces (e.g., stepped walls 324a–324c). If the o-rings are damaged, they can be easily replaced by simply removing the stem 330. Once the retaining nut 340 closes the flow passage, the sealing effectively is independent of closing torque applied.

In operation, when a tank interconnected to the body member 320 is to be filled with a fluid, such as hydrazine, the nut 340 may be rotated, such that the end portion 342 of the nut member 340 abuttingly engages the snap ring 350 to push the snap ring 350 and consequently, the stem 330, axially relative to the body member 320 to open the valve 310. More specifically, as the nut member 340 is rotated, an end portion 342 of the nut member pushes against the snap ring 350 to partially withdraw the stem 330 from the channel 322 of the member 320. As the stem 330 is axially withdrawn, the sealing member 334a loses abutting engagement with the first stepped wall 324a which allows fluid entering the end portion 36 of the stem 330 to flow through the passageway defined by the first stepped wall 324a of a body member 320, and through the channel 322 to a tank. Once the tank is filled with the fluid, the cap 360 may be threaded onto the stem member 330 to provide a redundant seal and to maintain cleanliness within the valve 310, and the nut member 340 may be rotated to push the stem 330 back into the body member 320, such that the sealing member 334a is in abutting engagement with the first stepped wall 324a to seal the valve 310. Such rotation of the nut 340 also results in the abutting engagement of a second and third sealing member 334b, 334c with the second and third stepped walls 324b, 324c, respectively, to provide additional redundancy in sealing the valve 310. The nut member 340 may be rotated in threaded engagement with the body member 320 until the surface 344 of the nut engages the surface 326 of a body member 320, which prevents over-torquing.

When in an open configuration, fluid may flow through the channel 338 defined by the inner wall surface of the stem 330 and through the ports 339a, 339b, 339c and 339d, the fluid then being flowable through the channel 322 of the body member 320. The ports 339a–339d may be positioned 90 degrees relative to each other, about the end portion of the stem 330.

As noted, the first, second, and third sealing members 334a, 334b, and 334c function not only to inhibit flow of a fluid through the valve 310, but also to inhibit metal-to-metal contact between surfaces of the stem 330 and the body member 320 when subjected to shear loads. Stated another way, the first, second and third sealing members 334a, 334b, and 334c maintain the body member 320 and stem 330 in spaced relation, even when the valve 310 is subjected to shear loads. One way of characterizing the degree of multi-functionality possessed by the service valve 310 is that the design of the service valve 310 (e.g., the size of the sealing members 334a–c, the resiliency of these sealing members 334a–c, the spacing between the wall of the body member 320 which defines the channel 322 and the exterior of the stem 330, the spacing between the various sealing members 334a–c) is such that the body member 320 and stem 330 are maintained in spaced relation, even when the valve 310 is exposed to a shear load of at least about 25 pounds (e.g., a load applied to that portion of the stem 330 which extends beyond the body member 320 and which is directed at least generally toward a longitudinal axis of the valve 310 which extends centrally through the channel member 322). Specific characteristics of the design of the valve 310 which allow the sealing members 334a–c to provide a sealing function, as well as to maintain the body member 320 and stem 330 in spaced relation include using compressed elastomeric seals, using multiple redundant seals, using multiple redundant sealing surfaces, and specific tight dimensional tolerances, such as ±0.001 inches.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A service valve, comprising:

an integrally formed valve body which comprises an at least generally longitudinally extending valve body bore, wherein said valve body bore comprises first and second ends which are longitudinally spaced, and wherein said valve body being integrally formed means that said valve body is formed from a single piece of material such that said valve body is free of any joint, wherein said valve body further comprises an inner wall which defines said at least generally longitudinally extending valve body bore, wherein said inner wall comprises first, second, and third wall sections which each have a longitudinal extent, wherein said second wall section is disposed longitudinally between said first and third wall sections, wherein a diameter of said valve body bore within said second wall section is different from a diameter of said valve body bore within said third wall section;

an at least generally longitudinally extending valve stem which is slidably disposed within said valve body bore and which comprises a valve stem bore;

a first leakpath defined between said valve body and said valve stem; and a plurality of longitudinally-spaced radial seals disposed between and engaging each of said valve body and said valve stem and which block said first leakpath at a plurality of longitudinally-spaced locations, wherein said valve stem is movable between at least first and second positions, wherein when said valve stem is in said first position, a first, second, and third radial seal of said plurality of longitudinally-spaced radial seals block said first leakpath at said first, second, and third radial seals by engaging said first, second, and third wall sections, respectively, such that said first end of said valve body bore is at least substantially isolated from said valve stem bore, and wherein when said valve stem is in said second position, said first radial seal is disengaged from said first wall section to allow flow through said first leakpath past said first radial seal such that said first end of said valve body bore is fluidly interconnected with said valve stem bore while said second and third radial seals each continue to block said first leakpath at said second and third radial seals by continuing to engage said second and third wall sections, respectively.

2. A valve, as claimed in claim 1, wherein:

said second and third wall sections are each at least generally cylindrical surfaces.

3. A valve, as claimed in claim 2, wherein:

said first wall section is an at least generally cylindrical surface, and wherein a diameter of said valve body bore within said first wall section is different than said diameter of said valve body bore within said second wall section.

4. A valve, as claimed in claim 3, wherein:

said diameter of said valve body bore within said first wall section is smaller than said diameter of said valve body bore within said second wall section.

5. A valve, as claimed in claim 4, wherein:

said diameter of said valve body bore within said second wall section is smaller than said diameter of said valve body bore within said third wall section.

6. A valve, as claimed in claim 2, wherein:

said diameter of said valve body bore within said second wall section is smaller than said diameter of said valve body bore within said third wall section.

7. A valve, as claimed in claim 2, wherein:

said first wall section is interconnected with said second wall section by a first chamfered transition section, and wherein said second wall section is interconnected with said third wall section by a second chamfered transition section.

8. A valve, as claimed in claim 1, wherein:

said service valve comprises a single leakpath, wherein said single leakpath is said first leakpath.

9. A valve, as claimed in claim 1, wherein:

each of said plurality of longitudinally-spaced radial seals are mounted on one of said valve body and said valve stem.

10. A valve, as claimed in claim 1, wherein:

said plurality of longitudinally-spaced radial seals maintain said valve stem and a portion of said valve body which defines said valve body bore in spaced relation, even when said service valve is exposed to a shear load of at least about 25 pounds.

11. A valve, as claimed in claim 1, wherein:

at least one of said plurality of longitudinally-spaced radial seals comprises first means for providing a fulcrum when said valve stem is exposed to a side load and preventing contact between said valve body and said valve stem when said valve stem is in said first position; and at least another of said plurality of longitudinally-spaced radial seals comprises second means for providing a fulcrum when said valve stem is exposed to a side load and preventing contact between said valve body and said valve stem when said valve stem is in said second position.

12. A valve, as claimed in claim 1, wherein:

said valve stem comprises first and second valve stem ends, wherein said first valve stem end is disposed within said valve body bore, wherein said second valve stem end extends beyond said second end of said valve body bore, and wherein said valve further comprises a valve stem cap which is detachably interconnectable with said second end of said valve stem so as to provide for a flow through said service valve when said cap is off said valve stem bore and so as to provide for a no flow condition through said service valve when said cap covers said valve stem bore.

13. A service valve, as claimed in claim 1, wherein:

said at least generally longitudinally extending valve stem comprises first, second, and third valve stem sections that each have a longitudinal extent, wherein said second valve stem section is disposed between said first and third valve stem sections, wherein said second and third valve stem sections have different diameters, and wherein said first, second, and third radial seals are mounted on said first, second, and third valve stem sections, respectively.

14. A service valve, comprising:

a valve body which comprises an inner wall which defines an at least generally longitudinally extending valve body bore which comprises first and second valve body bore ends, wherein said inner wall comprises first, second, and third wall sections which each have a longitudinal extent, wherein said second wall section is disposed longitudinally between said first and third wall sections, wherein said second and third wall sections are each at least generally cylindrical surfaces, wherein a diameter of said valve body bore within said second wall section is different from a diameter of said valve body bore within said third wall section, and wherein said inner wall is free from any joint between said second and third wall sections;

an at least generally longitudinally-extending valve stem which is slidably disposed within said valve body bore, wherein said valve stem comprises a valve stem body, a valve stem bore within said valve stem body, and at least one inlet port which extends through said valve stem body to said valve stem bore, wherein said valve stem extends through said second valve body bore end and at least towards said first valve body bore end, wherein said valve stem is movable between at least first and second positions within said valve body bore, wherein said first valve body bore end is at least substantially fluidly isolated from said valve stem bore when said valve stem is in said first position, and wherein said first valve body bore end is fluidly interconnected with said valve stem bore when said valve stem is in said second position;

a first radial seal which is disposed between and engages each of said first wall section of said valve body and said valve stem when said valve stem is in said first position, wherein said first radial seal is disengaged from at least one of said first wall section of said valve body and said valve stem when said valve stem is in said second position so as to fluidly interconnect said first valve body bore end and said valve stem bore;

a second radial seal which is at all times disposed between and engages each of said second wall section of said valve body and said valve stem, including when said valve stem is in each of said first and second positions; and a third radial seal which is at all times disposed between and engages each of said third wall section of said valve body and said valve stem, including when said valve stem is in each of said first and second positions.

15. A valve, as claimed in claim 14, wherein:

said valve body is integrally formed, and wherein said valve body being integrally formed means that said valve body is formed from a single piece of material and which is thereby free of any joint.

16. A valve, as claimed in claim 14, wherein:

said first wall section is an at least generally cylindrical surface, and wherein a diameter of said valve body bore within said first wall section is different than said diameter of said valve body bore within said second wall section.

17. A valve, as claimed in claim 16, wherein:

said diameter of said valve body bore within said first wall section is smaller than said diameter of said valve body bore within said second wall section.

18. A valve, as claimed in claim 17, wherein:

said diameter of said valve body bore within said a second wall section is smaller than said diameter of said valve body bore within said third wall section.

19. A valve, as claimed in claim 14, wherein:

said diameter of said valve body bore within said second wall section is smaller than said diameter of said valve body bore within said third wall section.

20. A valve, as claimed in claim 14, wherein:

said first wall section is interconnected with said second wall section by a first chamfered transition section, and wherein said second wall section is interconnected with said third wall section by a second chamfered transition section.

21. A valve, as claimed in claim 14, wherein:
said service valve comprises a single leakpath, wherein said first, second, and third radial seals block said single leakpath at three longitudinally-spaced locations when said valve stem is in said first position.

22. A valve, as claimed in claim 14, wherein:
each of said first, second, and third radial seals are mounted on one of said valve body and said valve stem.

23. A valve, as claimed in claim 14, wherein:
at least one of said first, second, and third radial seals maintains said valve stem and valve body in spaced relation, even when said valve stem is exposed to a side load of at least about 25 pounds.

24. A valve, as claimed in claim 14, wherein:
at least one of said first, second, and third radial seals comprises means for providing a fulcrum when said valve stem is exposed to a side load and preventing contact between said valve body and said valve stem when said valve stem is in said first position; and
at least another of said first, second, and third radial seals comprises means for providing a fulcrum when said valve stem is exposed to a side load and preventing contact between said valve body and said valve stem when said valve stem is in said second position.

25. A valve, as claimed in claim 14, wherein:
said valve stem comprises first and second valve stem ends, wherein said first valve stem end is disposed within said valve body bore, wherein said second valve stem end extends beyond said second end of said valve body bore, and wherein said valve further comprises a valve stem cap which is detachably interconnectable with said second end of said valve stem so as to provide for a flow through said service valve when said cap is off said valve stem bore and so as to provide for a no flow condition through said service valve when said cap covers said valve stem bore.

26. A service valve, as claimed in claim 14, wherein:
said at least generally longitudinally extending valve stem comprises first, second, and third valve stem sections that each have a longitudinal extent, wherein said second valve stem section is disposed between said first and third valve stem sections, wherein said second and third valve stem section have different diameters, and wherein said first, second, and third radial seals are mounted on said first, second, and third valve stem sections, respectively.

27. A service valve, comprising:
a valve body which comprises an at least generally longitudinally-extending valve body bore, wherein said valve body bore comprises first and second ends which are longitudinally spaced, wherein said valve body further comprises an inner wall which defines said at least generally longitudinally extending valve body bore, wherein said inner wall comprises first, second, and third wall sections which each have a longitudinal extent, wherein said second wall section is disposed longitudinally between said first and third wall sections, wherein a diameter of said valve body bore within said second wall section is different from a diameter of said valve body bore within said third wall section;
an at least generally longitudinally-extending valve stem which is slidably disposed within said valve body bore and which comprises a valve stem bore;
a first leakpath, wherein said first leakpath is defined between said valve body and said valve stem; and
a plurality of longitudinally-spaced radial seals disposed between said valve body and said valve stem and which block said first leakpath at a plurality of longitudinally-spaced locations, wherein said valve stem is movable between at least first and second positions, wherein when said valve stem is in said first position, a first, second, and third radial seal of said plurality of longitudinally-spaced radial seals block said first leakpath at said first, second, and third radial seals by engaging said first, second, and third wall sections, respectively, such that said first end of said valve body bore is at least substantially isolated from said valve stem bore, and wherein when said valve stem is in said second position, said first radial seal is disengaged from said first wall section to allow flow through said first leakpath past said first radial seal such that said first end of said valve body bore is fluidly interconnected with said valve stem bore while second and third radial seals each continue to block said first leakpath at said second and third radial seals by continuing to engage said second and third wall sections, respectively.

28. A service valve, as claimed in claim 27, wherein:
said at least generally longitudinally extending valve stem comprises first, second, and third valve stem sections that each have a longitudinal extent, wherein said second valve stem section is disposed between said first and third valve stem sections, wherein said second and third valve stem sections have different diameters, and wherein said first, second, and third radial seals are mounted on said first, second, and third valve stem sections, respectively.

29. A service valve, comprising:
a valve body which comprises an at least generally longitudinally-extending valve body bore, wherein said valve body bore comprises first and second ends which are longitudinally-spaced, wherein said valve body further comprises an inner wall which defines said at least generally longitudinally extending valve body bore, wherein said inner wall comprises first, second, and third wall sections which each have a longitudinal extent, wherein said second wall section is disposed longitudinally between said first and third wall sections, wherein a diameter of said valve body bore within said second wall section is different from a diameter of said valve body bore within said third wall section;
an at least generally longitudinally-extending valve stem which is slidably disposed within said valve body bore and which comprises a valve stem bore;
a first leakpath defined between said valve body and said valve stem; and
a plurality of longitudinally-spaced radial seals disposed between said valve body and said valve stem and which block said first leakpath at a plurality of longitudinally-spaced locations, wherein said valve stem is at least substantially free from direct contact with said valve body by said plurality of longitudinally-spaced radial seals under normal conditions and even when a reasonable side load is applied to said valve stem, wherein said valve stem is movable between at least first and second positions, wherein when said valve stem is in said first position, a first, second, and third radial seal of said plurality of longitudinally-spaced radial seals block said first leakpath at said first, second, and third radial seals by engaging said first, second, and third wall sections, respectively, such that said first end of said valve body bore is at least substantially isolated from said valve stem bore, and wherein when said valve stem is in said second position, said first radial seal is disengaged from said first wall section to allow flow through said first leakpath past said first radial seal such that said first end of said valve body bore is fluidly interconnected with said valve stem bore while said second and third radial seals each continue to block said first leakpath past said second and third radial seals by continuing to engage said second and third wall sections, respectively.

30. A service valve, as claimed in claim 29, wherein:

said at least generally longitudinally extending valve stem comprises first, second, and third valve stem sections that each have a longitudinal extent, wherein said second valve stem section is disposed between said first and third valve stem sections, wherein said second and third valve stem sections have different diameters.

31. A service valve, comprising:

an integrally formed valve body which comprises an at least generally longitudinally extending valve body bore, wherein said valve body bore comprises first and second ends which are longitudinally spaced, and wherein said valve body being integrally formed means that said valve body is formed from a single piece of material such that said valve body is free of any joint, wherein said valve body further comprises an inner wall which defines said at least generally longitudinally extending valve body bore, wherein said inner wall comprises first, second, and third wall sections which each have a longitudinal extent, wherein said second wall section is disposed longitudinally between said first and third wall sections, wherein said second and third wall sections are each at least generally cylindrical surfaces, wherein a diameter of said valve body bore within said second wall section is different from a diameter of said valve body bore within said third wall section;

an at least generally longitudinally extending valve stem which is slidably disposed within said valve body bore and which comprises a valve stem bore;

a first leakpath defined between said valve body and said valve stem; and a plurality of longitudinally-spaced radial seals disposed between and engaging each of said valve body and said valve stem and which block said first leakpath at a plurality of longitudinally-spaced locations, wherein said valve stem is movable between at least first and second positions, wherein at least three of said plurality of longitudinally-spaced radial seals block said first leakpath and said first end of said valve body bore is at least substantially isolated from said valve stem bore when said valve stem is in said first position, and wherein at least two of said plurality of longitudinally-spaced radial seals block said first leakpath and said first end of said valve body bore is fluidly interconnected with said valve stem bore when said valve stem is in said second position, wherein said plurality of longitudinally-spaced radial seals comprise:

a first radial seal which is disposed between and engages both said first wall section of said valve body and said valve stem when said valve stem is in said first position, wherein said first radial seal is disengaged from at least one of said first wall section of said valve body and said valve stem when said valve stem is in said second position so as to fluidly interconnect said first end of said valve body bore and said valve stem bore;

a second radial seal which is at all times disposed between and engages both said second wall section of said valve body and said valve stem, including when said valve stem is in each of said first and second positions; and a third radial seal which is at all times disposed between and engages both said third wall section of said valve body and said valve stem, including when said valve stem is in each of said first and second positions.

32. A service valve, comprising:

an integrally formed valve body which comprises an at least generally longitudinally extending valve body bore, wherein said valve body bore comprises first and second ends which are longitudinally spaced, and wherein said valve body being integrally formed means that said valve body is formed from a single piece of material such that said valve body is free of any joint;

an at least generally longitudinally extending valve stem which is slidably disposed within said valve body bore and which comprises a valve stem bore;

a first leakpath defined between said valve body and said valve stem; and a plurality of longitudinally-spaced radial seals disposed between and engaging each of said valve body and said valve stem and which block said first leakpath at a plurality of longitudinally-spaced locations, wherein said valve stem is movable between at least first and second positions, wherein at least three of said plurality of longitudinally-spaced radial seals block said first leakpath and said first end of said valve body bore is at least substantially isolated from said valve stem bore when said valve stem is in said first position, and wherein at least two of said plurality of longitudinally-spaced radial seals block said first leakpath and said first end of said valve body bore is fluidly interconnected with said valve stem bore when said valve stem is in said second position, wherein said plurality of longitudinally-spaced radial seals maintain said valve stem and a portion of said valve body which defines said valve body bore in spaced relation, even when said service valve is exposed to a shear load of at least about 25 pounds.

33. A service valve, comprising:

an integrally formed valve body which comprises an at least generally longitudinally extending valve body bore, wherein said valve body bore comprises first and second ends which are longitudinally spaced, and wherein said valve body being integrally formed means that said valve body is formed from a single piece of material such that said valve body is free of any joint;

an at least generally longitudinally extending valve stem which is slidably disposed within said valve body bore and which comprises a valve stem bore;

a first leakpath defined between said valve body and said valve stem; and a plurality of longitudinally-spaced radial seals disposed between and engaging each of said valve body and said valve stem and which block said first leakpath at a plurality of longitudinally-spaced locations, wherein said valve stem is movable between at least first and second positions, wherein at least three of said plurality of longitudinally-spaced radial seals block said first leakpath and said first end of said valve body bore is at least substantially isolated from said valve stem bore when said valve stem is in said first position, and wherein at least two of said plurality of longitudinally-spaced radial seals block said first leakpath and said first end of said valve body bore is fluidly interconnected with said valve stem bore when said valve stem is in said second position, wherein at least a first of said plurality of longitudinally-spaced radial seals comprises first means for providing a fulcrum when said valve stem is exposed to a side load and preventing contact between said valve body and said valve stem when said valve stem is in said first position, and wherein at least a second of said plurality of longitudinally-spaced radial seals comprises second means for providing a fulcrum when said valve stem is exposed to a side load and preventing contact between said valve body and said valve stem when said valve stem is in said second position.

* * * * *